United States Patent [19]
Williams

[11] Patent Number: 4,953,122
[45] Date of Patent: Aug. 28, 1990

[54] PSEUDO-ERASABLE AND REWRITABLE WRITE-ONCE OPTICAL DISK MEMORY SYSTEM

[75] Inventor: Chris Williams, Aptos, Calif.

[73] Assignee: Laserdrive Ltd., Santa Clara, Calif.

[21] Appl. No.: 925,157

[22] Filed: Oct. 31, 1986

[51] Int. Cl.$^5$ .................... G06F 15/00; G06F 12/02; G06F 3/06
[52] U.S. Cl. .................... 364/900; 364/944; 364/952.1; 364/952.31; 364/960; 364/963.2; 364/955.5; 364/961; 369/53; 369/59; 371/10.1
[58] Field of Search ... 364/200 MS File, 900 MS File; 371/10, 10.1, 10.2; 369/54, 58, 59, 53; 360/47, 49

[56] References Cited

U.S. PATENT DOCUMENTS

| | | | |
|---|---|---|---|
| 4,016,603 | 4/1977 | Ottesen | 360/135 |
| 4,142,209 | 2/1979 | Hedlund et al. | 358/128 |
| 4,161,753 | 7/1979 | Bailey et al. | 358/128 |
| 4,200,928 | 4/1980 | Allan et al. | 364/200 |
| 4,308,557 | 12/1981 | Dieterich | 371/38 X |
| 4,402,061 | 8/1983 | Hazel et al. | 365/127 |
| 4,434,487 | 2/1984 | Robinson et al. | 371/10 |
| 4,498,146 | 2/1985 | Martinez | 364/90 V |
| 4,512,006 | 4/1985 | Murakami et al. | 369/50 |
| 4,523,304 | 6/1985 | Satoh et al. | 369/32 |
| 4,575,827 | 3/1986 | Kulakowski | 365/230 |
| 4,583,208 | 4/1986 | Verboom | 369/32 |
| 4,604,694 | 8/1986 | Hongh | 364/300 X |
| 4,630,140 | 12/1986 | Sugimura et al. | 360/49 |
| 4,631,723 | 12/1986 | Rathburn et al. | 360/47 |
| 4,682,318 | 7/1987 | Busby | 369/59 |
| 4,775,969 | 10/1988 | Osterlund | 369/53 |

OTHER PUBLICATIONS

Bill Zoellick, "CD-ROM Software Development", Byte, May 1986 pp. 177-188.
Jeffrey R. Dulude, "The Application Interface of Optical Drives", Byte, May 1986, pp. 193-199.
"Optical Storage Shines on the Horizon", Carl Warren, Western Editor, Mini-Micro Systems, Dec. 1985, pp. 68-75.
Denise Caruso, "Finally, A SCSI Standars, But There are Still Loose Ends", Electronics, May 26, 1986, pp. 46-47.

Primary Examiner—Thomas C. Lee
Attorney, Agent, or Firm—McCubbrey, Bartels Meyer & Ward

[57] ABSTRACT

A write-once, read-many optical data storage system which includes an optical disk to which data is written such that a host data system having access to the optical data storage system is enabled to access any one of a predetermined number of logical addresses for storing data at a selected logical address whether or not data had previously been stored at that logical address. The write-once optical disk includes at least one recording surface divided into a plurality of storage segments, including a plurality of sequential data storage segments, each having a host data portion and a logical address portion, and having the physical location of each said data storage segment on said optical disk represented by a physical address different from the physical address of any other data storage segment on said disk, and a plurality of sequential mapping segments, each having a logical address portion. The optical data storage system further will write each successive host data received from the host system to the host data portion of a next sequential data storage segment not previously written to, and will write to the logical address portion of said next sequential data storage segment the logical address specified by said host system for said host data. The logical address portion is further written of the next sequential unwritten mapping segment the logical address specified by said host data system for said host data.

14 Claims, No Drawings

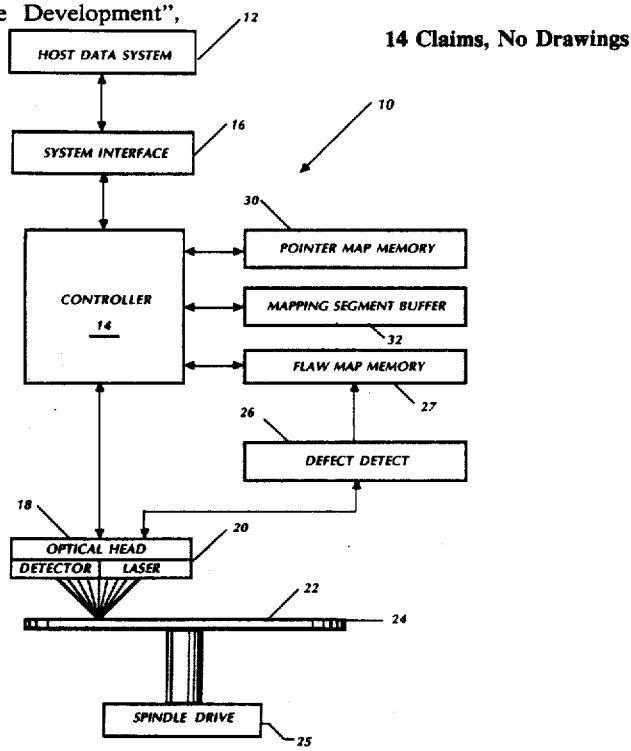

FIG. 2
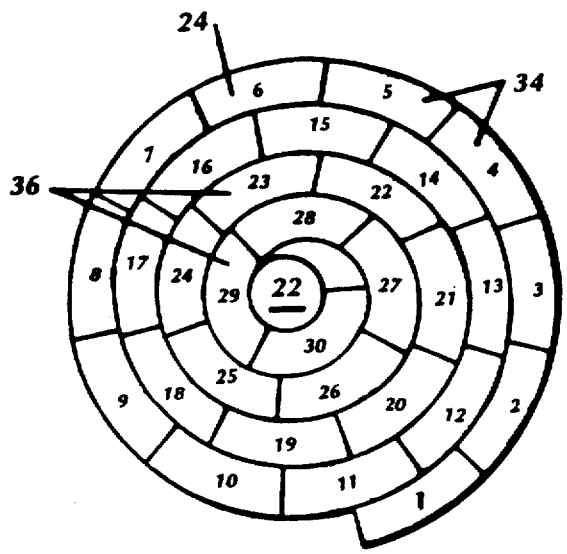
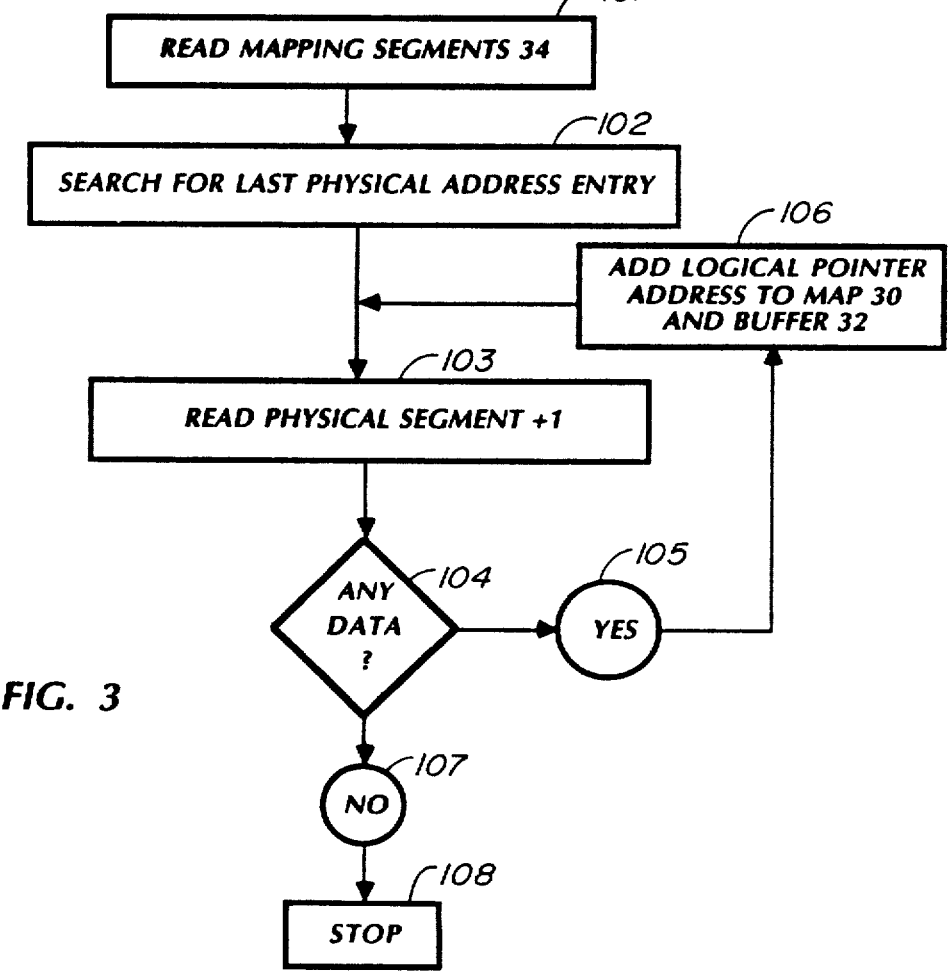
FIG. 3

PSEUDO-ERASABLE AND REWRITABLE WRITE-ONCE OPTICAL DISK MEMORY SYSTEM

BACKGROUND OF THE INVENTION

The present invention relates generally to the field of computer data storage systems and more specifically to the field of optical disk data storage systems.

Data storage systems are well known in the art and are commonly used in computer systems where data that is generated or manipulated must be stored and/or retrieved at will. Two major categories of data storage systems that are commonly used to store and retrieve large blocks of data include magnetic disk storage systems and optical disk storage systems. Each category has advantages and disadvantages.

Magnetic disk storage systems are usually used in applications requiring frequent erasure of stored data and replacement with updated data. An advantage of many such systems is that the magnetic storage media is removable, e.g. in floppy disk systems. Only lower capacity and slower access time versions of such systems are generally of this removable type, however. A key disadvantage of magnetic disks is that they are susceptible to mechanical damage as well as inadvertent erasures.

Optical disk systems typically are used where very large amounts of data are to be stored, e.g. 100 megabytes or more. Although optical disks generally are removable, most have the disadvantage of being read-only storage media. The optical disks are prerecorded in a conventional manner, such as using an ablative-pit method in which a precisely focused laser beam burns a depression or pit in the sensitive recording layer of the disk surface. In the optical disc reader, as the disk surface is passed under a light beam in the read mode, a photodetector senses the presence or absence of the depressions and emits electrical signals which are transformed into digital data bits.

Write-once optical disk data storage systems are now available, and offer very high data writing and reading capacity in a removable storage medium. However, such systems have the drawback that once data has been written into a sector of an optical disk, this data cannot be updated by rewriting the sector. Many attempts have been made in the art to enable the high storage capacity of write-once optical disk memories to be utilized efficiently in a computer system in a manner analogous to magnetic disk storage systems, wherein data in a given sector can be updated at will. All such attempts have had inherent problems.

A key problem relates to how the directory or index of stored data on the optical disk is maintained. Without such directory information, it is impossible to selectively access and retrieve data on the disk. In one approach, when data is stored on the optical disk its location is maintained in some sort of directory or index stored on a companion magnetic floppy or magnetic hard disk. This approach has the critical disadvantage of the susceptibility to loss of the directory by erasure or mechanical damage to the magnetic disk, which results in complete and irretrievable loss of the ability to selectively retrieve data stored on the optical disk. This is in addition to the need for keeping each magnetic directory disk physically associated with the optical disk whose directory it is storing. The loss of either of these media renders the other useless.

Another approach has been to store the optical disk directory on the optical disk and, when the disk is first inserted into the disk storage system, initializing an associated magnetic memory to correspond to this directory. As new data is written onto the disc, only the magnetic memory is updated. The entire magnetic memory version of the directory is rewritten onto the optical disk immediately prior to the removal of the disk or the powering down of the system. The disadvantage of this approach is that it uses much disk space since the entire directory may be written on the disk many times, and it is vulnerable to loss of the directory by power interruption before the directory has been rewritten onto the optical disk.

A third alternative method relies on address pointer fields associated with each data segment written to the disk. When data is written onto a particular segment of the optical disk, the associated pointer field remains blank. When an update of the data is desired, it is written to a different segment and the physical address, i.e. the actual physical location on the disk where the updated data has been written, is written to the pointer field of the original data segment. When data is to be read, the pointer field of the original data segment is read to determine the address of the updated information, if any. Because there may be a series of updates to updates in such a pointer field system, trying to read the most recent update of a desired data segment may result in a lengthy sequential examination of a trail of updated data segments before the current data segment is found. The inherent slowness of this system has the serious additional disadvantage of becoming worse and worse as more data updates are made on the optical disk.

What is needed in the art is a system whereby a map of where various data segments are written on the optical disk can be easily maintained and updated on the disk and whereby permanently written data on an optical disk can be used to construct an audit trail of all prior written data segments in the event of the loss of some portion of the disk map. Such a system would increase retrieval speed and provide, in effect, a pseudo-erasable optical disk storage system, a system that emulates an erasable magnetic storage medium while providing the high density storage advantages and data permanence of an optical disk.

The design of optical storage systems presents another inherent problem. Because the recording surface of an optical disk may have defects and because data cannot be retrievably written to a defective surface, it is necessary for the optical system to detect such defects and avoid writing to such areas. Typically, this is accomplished by making two passes over an area on the surface of the disk during each writing operation; once to write the data and once to verify the actual writing. This slows down the operation of the system considerably.

Accordingly, it is the general object of the present invention to provide an improved optical disk data storage system which allows a write-once optical disk to appear to a host system user to be a read/write disk.

Another object of the present invention is to provide an improved method for storing and retrieving data on an optical disk.

A further object of the present invention is to provide an improved optical data storage system which enables rapid identification and retrieval of data at the most recently written physical address on an optical disk corresponding to a selected host system logical address.

Yet another object of the present invention is to provide means for recovering lost directory information for any optical disk that has been written to in a manner according to the present invention.

A still further object of the present invention is to provide an improved optical data storage system in which defects in an optical disk recording surface are automatically detected and bypassed when writing to or recording data from the optical disk.

These and other objects of the present invention will become apparent from the following detailed description and the accompanying drawings.

SUMMARY OF THE INVENTION

The present invention is a write-once, read-many optical data storage system which includes an optical disk to which data is written such that a host data system having access to the optical data storage system is enabled to access any one of a predetermined number of logical addresses for storing data at a selected logical address whether or not data had previously been stored at that logical address. According to the present invention, a write-once optical disk includes at least one recording surface divided into a plurality of storage segments, including a plurality of sequential data storage segments, each having a host data portion and a logical address portion, and having the physical location of each said data storage segment on said optical disk represented by a physical address different from the physical address of any other data storage segment on said disk, and a plurality of sequential mapping segments, each having a logical address portion. The optical data storage system further includes means for writing each successive host data received from the host system to the host data portion of a next sequential data storage segment not previously written to, and means for writing to the logical address portion of said next sequential data storage segment the logical address specified by said host system for said host data. Means are also included for writing to the logical address portion of the next sequential unwritten mapping segment the logical address specified by said host data system for said host data.

When the host system has requested that data be read out from a selected logical address, means are included for determining the last physical address on said optical disk into which host data is written having such specified logical address, and means for reading the host data stored in the data storage segment at said last physical address and for transmitting this data to the host system.

The preferred embodiment of this invention includes a random access magnetic pointer map memory which stores a map of all available data logical addresses and their correspondence to the most recent physical addresses of the data storage segments on the associated write-once optical disk wherein host data has been written. This pointer map is generated on power up of the system and each time a new optical disk is inserted into the data storage system. All written sequential mapping segments on the disk are read as part of this initialization process.

To speed up the disk writing process and to minimize wasted disk space, a magnetic mapping segment buffer is provided to temporarily store a record of all recent physical address locations on the optical disk written into since the last time the disk mapping segments were updated, along with the correspondence between logical address of the last data stored at each such physical address. When full of data, the buffer is flushed to transfer this record to the next sequential series of unwritten mapping segments on the optical disk.

The preferred embodiment of this invention also includes means for detecting the location of defects in the recording surface of the optical disk and for storing the location of these defects in a predetermined segment of said optical disk. This information enables flawed areas of the disk to be bypassed when the system is writing host data on the disk. A separate magnetic flaw map memory may be included to keep track of defects arising after the original defect detection process has been performed.

The present invention has the advantage of emulating erasable magnetic memories while retaining all the characteristics of optical data storage systems, including their large data storage capacity and the permanence of stored data. The present invention also has the advantage of enabling the retrieval of disk directory information if the directory is ever lost or destroyed.

BRIEF DESCRIPTION OF THE DRAWINGS

FIG. 2 is a diagram showing the division of the recording surface of the optical disk into mapping segments, data storage segments, and a flaw map according to a preferred embodiment of the present invention;

FIG. 3 is a flow chart showing the sequence of steps included in the initialization operation of the data storage system according to the present invention;

DETAILED DESCRIPTION OF THE INVENTION

Figure 1:
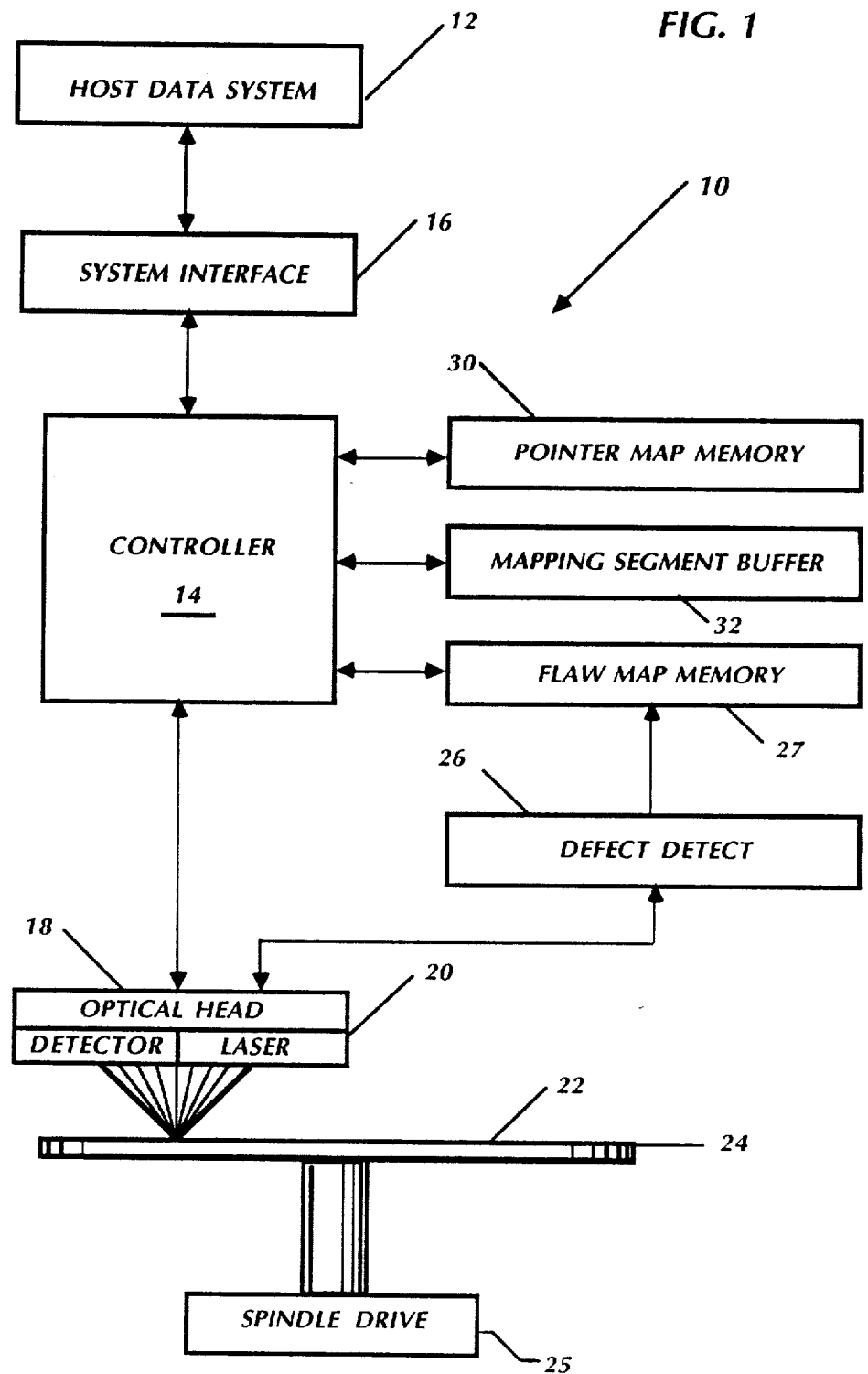
FIG. 1 is a block diagram of the main components of a preferred embodiment of an optical data storage system according to the present invention.

A pseudo-erasable write-once, read-many optical data storage system 10 according to the present invention is shown in block diagram form in FIG. 1. The storage system 10 is accessed by a host data system 12, such as a computer. Host system 12 either couples data to storage system 10 for storage at an address (defined as a "logical" address) specified by the host system or receives data stored at that address depending on whether a write or a read command has been generated by the host system. These commands are coupled to a controller means 14 in system 10 via a system interface 16. In the preferred embodiment, system interface 16 enables the system 10 to be accessed in a standard manner by the host system 12 over a bus shared by other peripheral devices. Usually, interface 16 uses "logical" rather than "physical" addressing. Even if the host system thinks it is addressing a physical address, the present invention will treat it as a logical address in the manner as explained below. All data is addressed by the host system 12 as logical blocks up to the maximum number of blocks available in a device. The actual physical address of any host system data in storage system 10 is not known to the host data system 12. An exemplary system interface 16 is the Small Computer Systems Interface (SCSI), known in the art.

Controller 14 controls an optical head 18 having a writing means, comprising a laser 20, for writing data to the recording surface 22 of a write-once optical disk 24. The data so written is permanently recorded on the recording surface 22; that is, the data is not intended to be eraseable or be overwritten. The laser 20 is directed to selected write positions on the surface 22 via conventional movement of optical head 18 under the control of controller 14 and via rotation of optical disk 24 via a spindle drive 25. The system 10 also preferably includes means 26 for detecting defects in the recording surface 22 of the optical disk 24 and for retaining the location of these defects in a flaw map memory 27. Flaw map 27 stores the location of defects at a predetermined storage location on the recording surface 22. Controller 14 includes means for preventing the writing of data to an area of the recording surface 22 on which a defect has been detected as specified by flaw map 27.

The present invention also includes a magnetic pointer map memory means 30, which preferably is a conventional random access memory (RAM). Pointer map 30 acts as a look-up table to keep track of where host data at each logical address are actually written on the optical disk. When the host data system 12 wishes to rewrite host data at a specified logical address, the new host data is actually written to the next sequential unwritten area of the optical disk, and the pointer map 30 is updated to reflect this new physical location for finding host data at the specified logical address. A key aspect of the operation of the present invention is that host data is always written to the optical disk 24 as if the disk 24 were a magnetic tape. That is, new host data is always written sequentially to the optical disk 24 beginning at the end of the last data storage segment written on disk 24. As described in greater detail below, the logical address of a given host data block is also stored on the optical disk 24 as part of each data segment written to the optical disk 24. Preferably, these logical addresses are also stored on the optical disk in a separate area on disk 24 as sequential mapping segments for enabling rapid initialization of pointer map 30 each time the new optical disk 24 is inserted into the system 10. As seen below, this greatly simplifies the initialization of pointer map 30.

More specifically, pointer map 30 contains a list of all data logical addresses available for storage of data by the host data system 12. Pointer map 30 further stores a map of the physical address of the data storage segment on the associated optical disk 24 wherein the most recent update of host data has been written for each logical address. For any logical address wherein the host data system 12 has not yet recorded data, no physical address is yet stored in the pointer map 30. An entry of 0 in pointer map 30 at any logical address indicates that data having this logical address has not yet been written on the optical disk. Controller 14 on power-up of the system 10, and each time a new optical disk 24 is inserted into the system 10, first reads all written sequential mapping segments on the disk 24 for reinitializing pointer map 30. The organization of these mapping segments and the way this initialization is performed is described in greater detail hereinbelow.

The optical disk is organized into a plurality of segments or sectors each having the ability to store a predetermined number of bytes of data, e.g. 512 bytes. Each sector is usually only available to be written to as part of a single write sequence. Since it would be inefficient to store a logical address in a separate location on the disk each time a host data block is written to the disk, it is preferrable that the history of the most recent write transactions on the surface of the disk be temporarily stored in a random access memory in system 10. Mapping segment buffer 32 provides this memory storage means. Mapping segment buffer 32 keeps track of the sequential physical addresses in which host data has been written in the data's corresponding logical address for each data segment stored. Preferrably, mapping segment buffer 32 is full when a sector's worth of data is contained therein. At that point, the buffer 32 is flushed by controller 14 to transfer this data to the next sequential unwritten mapping segment on the optical disk 24. Note that it is important that this mapping data be written to the same optical disk as the host data is written.

Should the buffer 32 not be filled when power is lost or when the user removes the optical disk 24 from the system 10, the mapping data is not lost nor is the ability lost to access selectively the most recent host data stored on the disk 24. This is because, as mentioned above, a separate audit trail has been written onto optical disk 24 during writing of each host data to a given data storage segment. When a host data block is stored in a data storage segment, a part of the storage segment is reserved for storage of the logical address of this host data. Thus, if the data in the magnetic segment buffer 32 is lost, controller 14 can read the sequentially written data storage segments that have been written on disk 24 since the last buffer 32 contents were written to the disk, to regenerate the mapping data lost.

Referring to FIG. 2, shown is an exemplary recording surface 22 of an optical disk 24, including 30 segments for the writing of data. In practice, as described below, a given optical disk may include hundreds of thousands of segments for the storage of data. As seen, the recording surface 22 shown in FIG. 2 is divided into mapping segments or sections 34 and data storage segments or sections 36, and one or more flaw mapping segments 38 arranged in a spiral manner. Thus, for example, segments 1 and 2 would store disk flaw data, segments 3—10 would be available for storage of mapping segments 34 and the remaining segments 11–30 would be available for data storage segments 36. With this segment organization, all segments have the same length so that the longer outer tracks of the recording surface 22 contain more segments than do the tracks nearer the center of the disk 24. This constant linear velocity (CLV) organization means that the relative speed with which data is read from the disk 24 remains the same as the reading progresses from the outer edge of the disk 24 inward. This arrangement allows data to be packed on outer tracks just as tightly as on inner tracks, thereby greatly increasing the storage capacity of system 10.

Alternative arrangements of mapping segments 34 and data storage segments 36 on disk 24 are possible within the scope of the present invention. For example, constant angular velocity (CAV) can be achieved by making segments on outer tracks physically larger than those on inner tracks. This results in a disk organized as concentric rings rather than as a continuous spiral of segments.

Another alternative arrangement would be where the mapping segments are positioned into several separate areas on the disk surface 22. This arrangement enables faster writing of host data where the mapping segment data is not initially buffered in a buffer such as buffer 32, since a given mapping segment is nearer to the segment into which data is being written, but it requires additional seeking of mapping segments during initialization of the pointer map 30. Although one could go still farther, according to the present invention, and rely just on recording the logical address after each host data is written to a given data storage segment, eliminating the separate mapping segments entirely, this approach adds two disadvantages which would be significant in most applications. First, every single sector or segment would then need to be read out to complete initialization of the pointer map 30. This initialization process might take as along as 45 minutes for a standard sized optical disk. The second disadvantage is that this approach eliminates the ability of the system 10 to be resistant to loss of mapping data written on the disk. According to the preferred embodiment, with the logical addresses stored both with each respective host data block and in the separate mapping segments, the loss of a given mapping segment and the data therein, due to disk damage, for example, would be recoverable by reading the logical addresses stored in the corresponding data segments.

As explained above, the present invention requires that some disk space be reserved for use as a sequential history of every write transaction that has taken place on the surface of the disk 24. This disk space comprises mapping segments 34. The amount of space needed for this write transaction history is dependent upon the number of sectors on the disk surface which can be written. As mentioned below, one or more techniques will be available to lessen the amount of sector space required for the storage of this history. Preferably, the write transaction history is kept on the optical disk 24 in one predetermined contiguous area preceding the host data system user data space containing a plurality of mapping segments 34.

The information stored in mapping segments 34 comprises a sequential table of each logical address of a host data block written to the disk 24. Since the physical address on disk 24 of the first data storage segment 36 is known, and all subsequent data storage segments are preferably written sequentially after the first data storage segment on the optical disk, the physical address on the disk 24 corresponding to a given logic address stored need not be stored in the mapping segments 34. That is, the position of each logical address in the mapping segment identifies the corresponding physical address. As mentioned above, during initialization of the system 10, the location information stored in mapping segments 34 is read into pointer map 30 prior to the optical disk 24 being available for writing or reading by the host data system user.

To more clearly understand the manner in which location information is stored in the mapping segments 34, please refer to Table I. Table I is an example of the writing of host data and logical address information to a disk 24 that is being used for the first time. It is assumed in this example that a first mapping segment 34, e.g., segment 10, is being filled, that sectors 10-99 are reserved for mapping segments 34, and that host data may be stored in the balance of the sectors on the disk, e.g., sectors 100-100,000. Lastly, assume in this example that the logical memory being emulated by system 10 will provide read/write access to host system 12 of logical addresses 0-999. Consequently, it is conceivable that with 100,000 physical sectors available for 1,000 sectors of logically addressable area, each logical address could be rewritten 100 times by the host system before filling up the optical disk, assuming each logical address is written the same number of times. As also shown, one or more sectors may be reserved for a flaw map, comprising one bit of data for each physical sector to be mapped on the disk. In this map, a zero indicates that the sector is writeable and a one indicating that the sector is flawed and therefore unwriteable. No address data is needed in the flaw map because it stores flow data for each sequential sector on the disk 24 in the same sequential order.

TABLE I

| Disk Physical Segment Addr. | Host System Determined | | Mapping Segment 34 | Flaw Map |
|---|---|---|---|---|
| | Logical Segment Addr. | Data Stored | | |
| 100 | 000 | Data 1 | 000 | 0 |
| 101 | 005 | Data 2 | 005 | 0 |
| 102 | 006 | Data 3 | 006 | 0 |
| 103 | Flaw | — | FFFFFF | 1 |
| 104 | Flaw | — | FFFFFF | 1 |
| 105 | 500 | Data 4 | 500 | 0 |
| 106 | 501 | Data 5 | 501 | 0 |
| 107 | 006 | Data 6 | 006 | 0 |
| 108 | 000 | Data 7 | 000 | 0 |
| 109 | — | — | | |
| . | . | . | . | . |

As seen in Table I, the first physical segment into which host system user data can be written is, in this example, physical segment 100. If, as its first write operation, the host wishes to write host data identified as "data 1" to logical address 000, the data storage segment at physical location 100 on disk 24 has data 1 written to it along with the logical segment address 000. The first logical address storage portion of mapping segment 34 is also written with the logical address 000.

Note that the number of bytes in mapping segment 34 needed for storage of a logical address depends on the number of locations logically addressable by the specific system. In the preferred embodiment, three bytes of storage space are allocated for each logical address entry in mapping segment 34.

Referring again to Table I, now let us assume that the host user wishes to next store host data comprising data 2 at logical segment address 005. This host data is stored in the next sequential data storage segment address 101 on disk 24 and mapping segment 34 is updated with this new logical address 005. Where the flaw map indicates that a given physical segment is flawed, the controller 14, via flaw map memory 27, described in greater detail below, will skip the flawed segments. Thus, as seen in Table I, the data storage segments at physical address 103 and 104 are skipped by controller 14 since flaw map 27 indicates that these segments are flawed. An indication that these segments 36 were flawed and skipped is added to the mapping segment 34 map.

An example of how the system 10 takes care of when the host data system 12 user wishes to update data at a particular logical address is also illustrated in Table I. After physical segments at addresses 105 and 106 have been written, host data identified as "data 6" is written to the data storage segment 34 at physical address 197. Its logical address is logical address 006, and mapping segment 34 is updated with this logical address 006. Consequently, if subsequent to this writing transaction, the host data system 12 wishes to read the contents of logical address 006, the disk 24 will read the data storage segment 36 at physical address 107 and not the data at physical address 102.

| RAM Map 30 Actual Addr. | Logical Addr. | Physical Address |
|---|---|---|
| X | 000 | 108 |
| X + 1 | 001 | 0 |
| X + 2 | 002 | 0 |
| X + 3 | 003 | 0 |
| X + 4 | 004 | 0 |
| X + 5 | 005 | 101 |
| X + 6 | 006 | 107 |
| X + 7 | 007 | 0 |
| . | . | . |
| . | . | . |
| . | . | . |
| X + 500 | 500 | 105 |
| X + 501 | 501 | 106 |
| . | . | . |
| . | . | . |
| . | . | . |

To prevent having to read the mapping segments 34 on the disk 24 whenever a read operation is desired, a pointer map 30 is maintained by controller 14 in random access memory. An exemplary pointer map 30 is illustrated in Table II. This table duplicates the data in mapping segment 34 shown in Table I, except that preferably pointer map 30 is oriented by logical address rather than by disk physical segment address. Thus, Table I indicates that logical address 000 was last written with data 7 at physical segment address 108. This physical address 108 is therefore shown in the pointer map 30 illustrated in Table II as being the location to look to for the most recent host data written to logical address 000. Since no data has been written to logical addresses 001-004, no physical address is included in pointer map 30 for these logical addresses. A zero in the physical address column indicates that no data has been written to these logical addresses as yet. Logical address 005 is shown to include data at physical address 101, the last time that this logical address was written to by the host user. Finally, logical address 006 has been written to twice, and the most recent data for this logical address is indicated as being located in the data storage segment 36 at physical address 107. As shown in Table I, data identified as data 6 is stored at this physical address 107.

Also illustrated in Table II, the actual RAM addresses where the logical addresses are maintained can begin at any arbitrary location X. Preferably, the logical addresses are stored in chronological order in the pointer map 30, but this is not required.

Also retained in a random access memory, as mentioned above, is the flaw map memory 27. On initialization of a given disk 24, the segments on the disk 24 containing the flaw map are read by controller 14 and transferred to the flaw map memory 27 to enable its rapid access by controller 14 during a given write transaction. Before any given write to disk operation, or a series of such operations, is performed by the system 10, it is preferred that the controller 14 certify that no new data storage segments 36 have become flawed. To do this, controller 14 causes the optical head 18 to scan the remaining unwritten data storage segments 36 on the disk 24 to determine if any additional defects now exist in any such segment. An unwritten segment should read as if all zero's were written to the segment. Note that this need to certify that no new flaws have been created on a disk may only need to be performed every month or so, where the system has remained on and the disk has not been removed from the system.

Defect detecting means 26 detects any new defective segment 36 and updates the flaw map memory 27 with this information. Flaw map 27 comprises a one bit storage location for each sector or segment 36 addressable on the disk 24. It is organized in the same manner as the flaw map stored on disk 24. Note that the location of flawed segments is never mapped in pointer map 30. Pointer map 30 only points to segments at physical addresses where data has been properly written.

Mapping segment buffer 32 in system 10 stores only the most recent write transactions that have occurred since the contents of buffer 32 were last written onto the disk 24. Buffer 32 is valuable to insure that a given mapping segment 34 is not written to until sufficient transaction data exists to fill the entire segment 34. For example, if a given mapping segment 34 is 512 bytes long, and a given logical address can be stored in 3 bytes, approximately 170 such logical addresses representing 170 writing transactions onto disk 24 can be stored in buffer 32 prior to writing of the contents of buffer 32 to the next mapping segment 34. The advantage of buffer 32 is that it prevents the necessity, after each write transaction, of requiring that the optical head 18 seek the next available mapping segment 34 for storage of the logical address history data relating to that write transaction. This also ensures that, upon initialization, a large number of seeking steps are not required by the controller 14 to find and recover the contents of scattered mapping segments 34 for initializing pointer map memory 30.

Should the mapping segment buffer 32 not be filled when power is lost or when the user removes the disk medium 24 from the system 10, the unwritten information is not lost, nor is the host data lost. Each host data block stored in a respective data storage segment 36 includes its own logical addresses. Each of these logical addresses written subsequent to the last time that write transaction history was taken from buffer 32 and stored on a mapping segment 34, is readable by the controller 14 when the disk 24 is reinserted into the system 10. At that point, the mapping segment buffer 32 after reinitialization of the data from disk 24, will correspond to the buffer 32, prior to power loss or removal of the medium from system 10.

Even where write transaction history has been written to a mapping segment 34, and that segment or series of segments is lost, the system 10 can resurrect this data. In a preferred embodiment of the invention, each mapping segment 34 has its own address which can be read by a controller 14. This address is incremented sequentially for each sequential mapping segment 34 written by the system 10 onto disk 24. Thus, if the mapping segment 34 at sector locations 15 and 16 are lost, for example, upon reinitialization of the disk 24, mapping segment 16 will be found after mapping segment 13. Controller 14 will thus note the loss of the two intervening segments, and will proceed with the resurrection of the contents of these last segments in the same manner as buffer 32 is initialized. The resurrected segment 34 data is recorded at the next sequential unwritten mapping segments 34 on the disk 24. Thus, for example, if 20 mapping segments 34 had been written and mapping segments 14 and 15 had been lost, after this regeneration procedure has occurred, the series of mapping segments 34 would have the following addresses, 13, 16, 17, 18, 19, 20, 14, 15, . . . . Thus, the next time that the mapping segments 34 are read from the disk 24 during a reinitialization, the missing segments 34 will be located later in the mapping segments 34.

As is seen, whenever the system 10 is powered up or a new disk 24 is inserted into the system 10, a initialization routine is performed by controller 14. A flow chart of an exemplary initialization routine is shown in FIG. 3.

Referring now to FIG. 3, during initialization, controller 14 first reads a given mapping segment 34 and fills pointer map 30 with the logical address pointers stored at the first mapping segment 34. The subsequent mapping segments 34 are then read and pointer 30 updated with the logical address information stored in each of these segments 34. This is show as step 101. Note that the controller 14 knows that the first entry in the first mapping segment 34 corresponds to the first physical address location of data storage segments 36 on that particular disk 24.

Once all of the mapping segments 34 have been read, the last physical segment 36 that contains host data is determined at step 102 whose logical address is stored in a mapping segment 34. The controller 14 then searches for subsequent sequential data storage segments at step 103 that have been written to with data by the host data system 12 whose logical addresses are not included in a mapping segment 34. Step 104 is a query branch for data found or not found. Where data is found denoted at 105, the logical address of that data is added to both pointer map 30 and buffer 32 at step 106. The controller 14 then increments by one at step 103 to look at the next sequential physical segment to again test to see if any data is stored in that segment 36. Once all of the physical segments have been sequentially tested in this manner and the next data storage segment is indicated as not having any data therein denoted at 107, indicates that the initialization process has been completed by controller 14 denoted by step 108. The result of this process is the rebuilding of the entire sector buffer 32 and complete updating of pointer map 30 for enabling accurate access to all most recent host data updates to the logical addresses maintained on disk 24.

After the initialization of the system, controller 14 knows the address of the next unwritten data storage segment 36 available for use for storing the next host data brought from the host data system 12. Note also that controller 14 keeps track of the total number of physical sectors available for writing so that when all remaining sectors have been written or contain flaws, controller 14 is able to indicate disk full status.

Figure 4:
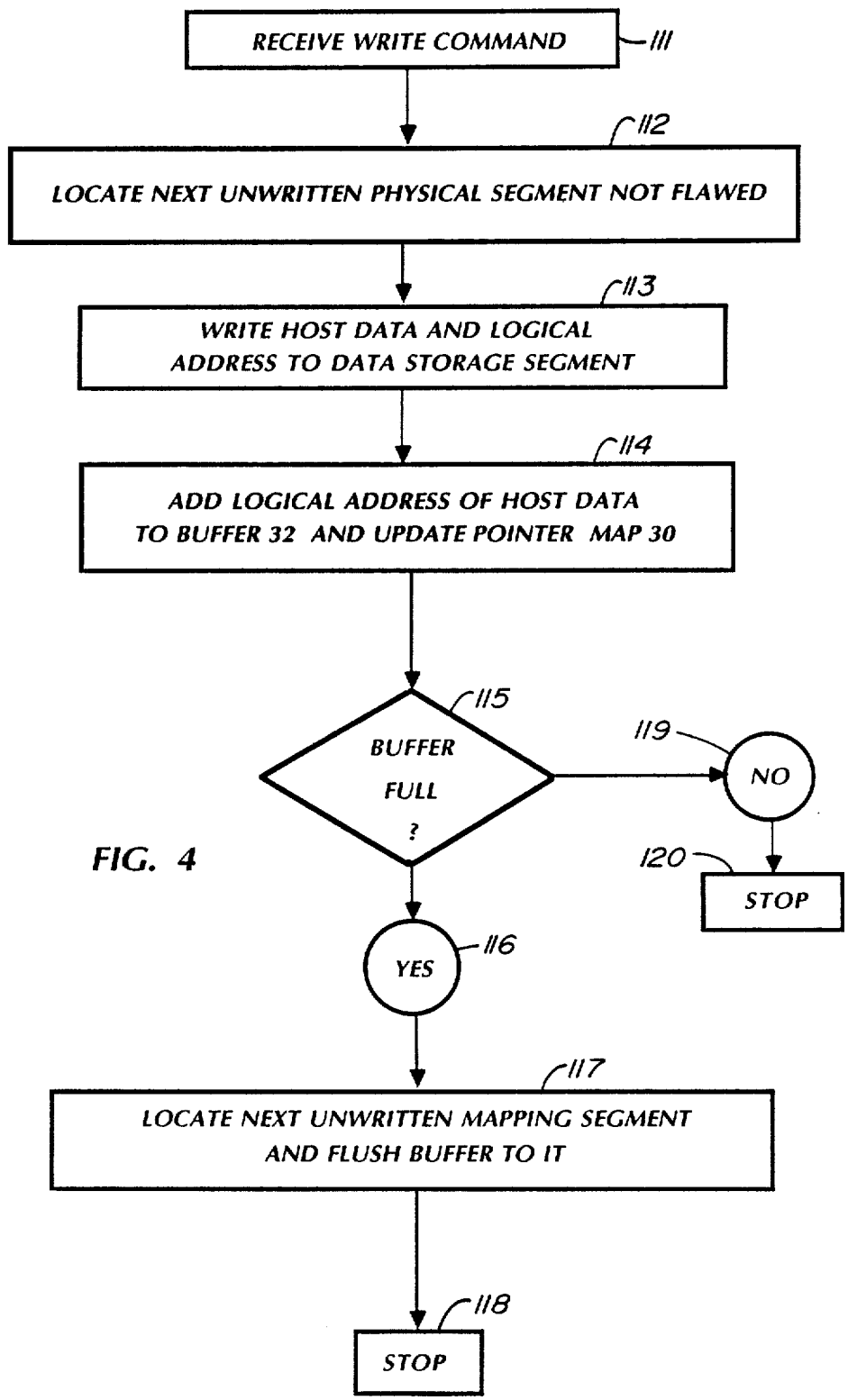
FIG. 4 is a flow chart showing the sequence of steps included in the write operation of the data storage system according to the present invention.

Referring now to FIG. 4, shown therein is a flow chart of the process for writing data to the disk 24 according to the present invention. As seen in FIG. 4, after a receive write command is received by system 10 at 111, controller 14 first locates the next sequential free data storage segment on disk 24 that is not flawed at step 112. The host data is then written to this data storage segment 36 along with the logical address of the host data at 113. The write transaction is then written to the mapping segment buffer 32 to update the write transaction history stored therein for later recording on the disk 24 at the next mapping segment 34. The logical address is also used to update the pointer map memory 30. These steps are shown at 114. Controller 14 then looks to see if buffer 32 is full at 115. If buffer 32 is not full, this completes the writing operation. If the buffer is full as indicated at 116, the next unwritten mapping segment 34 is located and the contents of buffer 32 is flushed to this next mapping segment 117. Once this operation is completed, the writing operation ends at 118. If the buffer is not full, as indicated at 119, then the writing operation ends, as shown at step 120.

Figure 5:
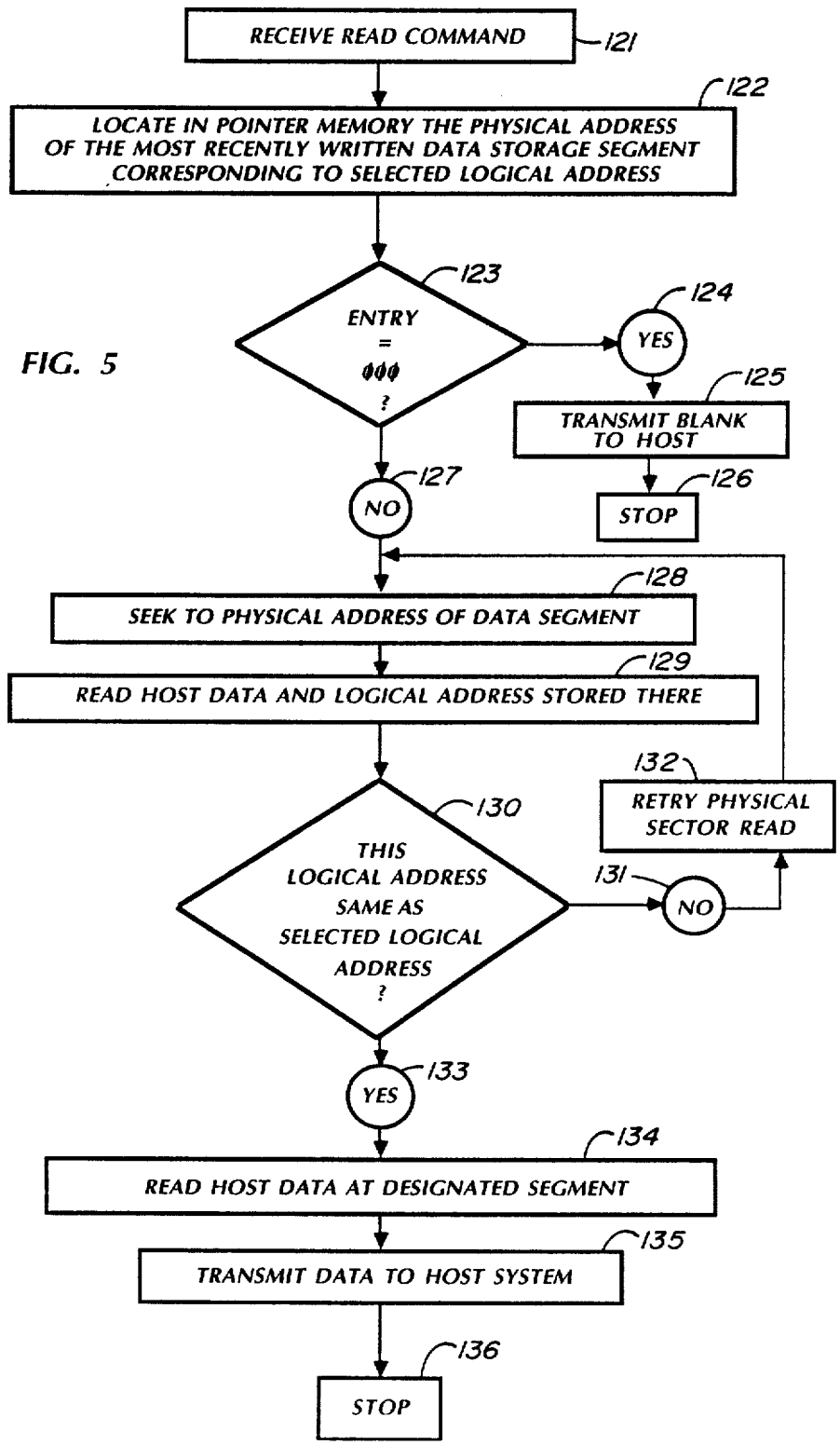
FIG. 5 is a flow chart showing the sequence of steps included in the read operation of the system when it retrieves only the most recently written host data for a selected, logical address according to the present invention.

FIG. 5 illustrates the operation of controller 14 when a read command is received by the system 10 at 121. As seen in FIG. 5, the host data system 12 couples to the system 10 a logical address that it wishes to receive host data from. This is received by controller 14 and is used to extract the data storage segment 36 physical address from the pointer map memory 30 corresponding to this logical address for the most recently written host data thereto, as indicated at 122. Then a query branch 123 queries the entry. If the entry in pointer map memory 30 is a zero as shown at 124, or a null entry, the controller 14 will transmit blank data to the host system 12, as shown at 125, and then will end this operation, as shown at 126. If the entry is not zero, as shown at 127, the optical head 18 is caused to seek to the physical address of the data storage segment 36 which was found in the above steep to obtain the most recently written host data for the specified logical address as shown at 128. The controller 14 then reads the data stored at the specified segment 36 along with the logical address stored in the selected data storage segment at 129. A query branch is shown 130, wherein if the detected logical address is not the same as that requested by the host system 12, as shown at 131, the controller 14 retries to read the specified physical sector at 132. If the logical addresses match, as indicated at 133 the host data at the designated data storage segment is read at 134 and transmitted back at 135, to the host data system 12 and the procedure is stopped, as shown at 136.

As mentioned above, alternative ways of storing write transaction history in mapping segment 34 and in pointer map 30 are contemplated within the scope of the present invention. For example, the host data system may elect at the beginning of writing of a particular disk to format all write transactions so as to include four data storage segments or some other number of data storage segments for each write operation. As a result, in a disk 24 having identical numbers of sectors, if only one fourth of the number of normal data storage segments need be kept track of, the corresponding size of the pointer map 30 is also reduced by four. This is also important, for example, in a conventional optical disk 24 having over 700,000 sectors, since it would reduce the number of mapping segments 34 needed to maintain a history of the writing of data to these sectors.

Where a series of flawed sectors are grouped in sequence, e.g., the sectors at physical locations, 30-33 are flawed, the representation of these flawed sectors may also be reduced by storing a record of such grouped flawed sectors in a single 3 byte entry in the mapping segments 34. As part of this entry, 1 byte of data would indicate the number of flawed sectors in the group.

From the foregoing, it can be seen that the objects of the present invention are met so as to gain advantages over the prior art. The present invention provides an improved optical data storage system for emulating a read/write magnetic disk. The system and the method of its use provide means to detect and bypass defects in the recording surface of the optical disk, and to permanently retain data without erasure. The present invention further provides for rapid identification and retrieval of stored data stored at any one of a plurality of logical addresses as well as for protection of disk's data directory from loss.

It is understood that although the preferred embodiment of the present invention has been described and illustrated above, alternatives and equivalents thereof will be apparent to those skilled in the art and, accordingly, the scope of the invention should be defined only by the appended claims and equivalents thereof.

What is claimed is:

1. An optical data storage system for enabling writing of data to and reading of data from a write-once, read-many optical disk, by a host system such that said host system is enabled to access any one of what it perceives to be a predetermined number of rewritable physical addresses in a perceived random access memory for storing host data, said system comprising:

means for periodically receiving host data from said host system and a physical address specified by said host system at which said host system perceives said host data is being stored;

a write-once optical disk including at least one recording surface divided into a plurality of storage segments, including a plurality of sequential data storage segments each having a host data portion and a logical address portion and having a given physical location on said recording surface, and having said physical location of each said data storage segment on said optical disk represented by a physical address different from the physical address of any other data storage segment on said disk, said optical disk further including a plurality of sequential mapping segments, each mapping segment for storing at least one of said perceived physical addresses;

means for writing each received host data to the host data portion of a next sequential unwritten data storage segment, including means for writing to the logical address portion of said next sequential data storage segment the perceived physical address specified by said host system for said host data;

means responsive to said host data writing means for writing to a next sequential unwritten mapping segment the perceived physical address specified by said host data system for said host data being written to the next sequential unwritten data storage segment by said host data writing means such that the physical address of said next sequential data storage segment is a function of the physical location on said disk of the mapping segment in which the perceived physical address of said host data is stored; and means for retrieving the host data stored at a perceived physical address specified by said host system, including means for determining the physical address on said optical disk of the sequential data storage segment into which host data was most recently written having said specified perceived physical address, and means for reading the host data stored in the data storage segment at said physical address, wherein said means for determining the physical address on said optical disk of the most recent sequential data storage segment into which host data was written having a specified perceived physical address comprises pointer map memory means for storing a map of all available host data perceived physical addresses and the associated physical addresses of the most recent sequential data storage segments on said optical disk wherein host data having the corresponding specified perceived physical addresses have been written, said means for writing host data to a next sequential unwritten data storage element including means for updating said pointer map memory means with the physical address of said next sequential data storage segment such that the perceived physical address specified by said host system for said host data is associated in said pointer map memory means with the physical address on said optical disk of said next sequential data storage segment.

2. The system of claim 1 further comprising:

means for initializing said pointer map memory means, said initializing means including means for reading said mapping segments and for storing in said pointer map memory means for each perceived physical address addressable by said host system the physical address on said optical disk of the most recent data storage segment wherein host data intended by said host system to be stored at said perceived physical address has been stored, said initialization means being operative upon power-up of said system and each time a new optical disk is inserted into said system.

3. The system of claim 2 wherein said initializing means comprises means for generating the physical address of a data storage segment in which host data is stored for each perceived physical address stored in said mapping segments.

4. The system of claim 1 wherein said pointer map memory means comprises a random access memory.

5. The system of claim 1 further comprising means for detecting and for storing on said optical disk the location of any flawed data storage segments in said recording surface of said optical disk and means responsive to said flaw location storing means for preventing host data from being written to any said flawed data storage segment.

6. The system of claim 5 further comprising means for updating said flaw location storing means with the location of any new flaws detected in said recording surface of said optical disk.

7. The system of claim 1 wherein one perceived physical address is stored in each sequential mapping segment and the total number of sequential mapping segments on said optical disk is equal to the total number of data storage segments on said optical disk.

8. An optical data storage system for enabling writing of data to and reading of data from a write-once, read-many optical disk by a host system such that said host system is enabled to access any one of a predetermined number of rewritable physical addresses in what it perceives to be a random access memory for storing and retrieving host data, said system comprising:

means for periodically receiving host data from said host system and a physical address specified by said host system at which said host system perceives said host data is being stored;

a write-once optical disk including at least one recording surface divided into a plurality of storage segments, including a plurality of sequential data storage segments, each having a host data portion and a logical address portion and having a physical location on said recording surface, and having said physical location on each said data storage segment on said optical disk represented by a physical address different from the physical address of any other data storage segment on said disk, said optical disk further including a plurality of sequential mapping segments, each mapping segment for storing at least one perceived physical address;

means for writing each received host data to the host data portion of a next sequential unwritten data storage segment, including means for writing to the logical address portion of said next sequential data storage segment the perceived physical address specified by said host system for said host data;

means responsive to said host data writing means for temporarily storing the perceived physical address specified by said host system for said host data being written by said host data writing means;

means for transferring the contents of said perceived physical address storing means to a next sequential unwritten mapping segment on said disk after a predetermined number of said perceived physical addresses have been stored in said temporary storing means; and means for retrieving the host data stored at a perceived physical address specified by said host system, including means for determining the physical address on said optical disk of the sequential data storage segment into which host data was most recently written having said specified perceived physical address, and means for reading the host data stored in the data storage segment at said physical address, wherein said means for determining the physical address on said optical disk of the most recent sequential data storage segment into which host data was written having a specified perceived physical address comprises pointer map memory means for storing a map of all available host data perceived physical addresses and the associated physical addresses of the most recent sequential data storage segments on said optical disk wherein host data having the corresponding specified perceived physical addresses have been written, said means for writing host data to a next sequential data storage segment including means for updating said pointer map with the physical address of said next sequential data storage segment such that the perceived physical address specified for said host data is associated in said pointer map memory means with the physical address on said optical disk of said next sequential data storage segment.

9. The system of claim 8 further comprising:

means for initializing said pointer map memory means, said initializing means including means for reading said mapping segments and means for sequentially reading the perceived physical addresses of any data storage segments wherein host data is written and where no corresponding perceived physical addresses having been stored in any said mapping segment and for storing in said pointer map memory means for each perceived physical address addressable by said host system the physical address on said optical disk of the most recent data storage segment found by said mapping segments reading means and perceived physical addresses reading means wherein host data intended by said host system to be stored at said perceived physical address has been stored, said initialization means being operative upon power-up of said system and each time a new optical disk is inserted into said system.

10. The system of claim 9 wherein said initializing means comprises means for generating the physical address of a data storage segment in which host data is stored for each perceived physical address stored in said mapping segments.

11. The system of claim 9 wherein said pointer map memory means comprises a random access memory.

12. The system of claim 8 further comprising means for detecting and for storing on said optical disk the location of any flawed data storage segments in said recording surface of said optical disk and means responsive to said flaw location storing means for preventing host data from being written to any said flawed data storage segment.

13. The system of claim 12 further comprising means for updating said flaw location storing means with the location of any new flaws detected in said recording surface of said optical disk.

14. The system of claim 8 wherein one perceived physical address is stored in each sequential mapping segment and the total number of sequential mapping segments on said optical disk is equal to the total number of data storage segments on said optical disk.

* * * * *